CONNECTOR BLOCK ASSEMBLY

Filed Dec. 30, 1965

INVENTORS
PHILIP G. BACKHOLM
LOREN B. PRENTICE
BY
Blair Buckles & Cesari
ATTORNEYS INVENTORS
PHILIP G. BACKHOLM
LOREN B. PRENTICE
BY
Blair Buckles & Cesari
ATTORNEYS United States Patent Office 3,371,307

Patented Feb. 27, 1968

3,371,307

CONNECTOR BLOCK ASSEMBLY

Philip G. Backholm, Northboro, and Loren B. Prentice, West Acton, Mass., assignors to Digital Equipment Corporation, Maynard, Mass.

Filed Dec. 30, 1965, Ser. No. 517,583
10 Claims. (Cl. 339—121)

ABSTRACT OF THE DISCLOSURE

A connector block assembly includes a plurality of individual blocks. Each block is located longitudinally on a positioning bar by means of a pin extending from the bar to the block. The block is positioned traversely to the bar by welding together interfitting portions of the bar and block.

This invention relates to a connector block assembly. It relates more particularly to a connector block and means for mounting same within a computer or other such installation very quickly, yet accurately enough so that its terminals can be soldered or wire-wrapped automatically while the block is in place.

Briefly, a connector block is a fixture for supporting a number of electrical modules such as printed circuit boards as well as for establishing electrical connections between the terminals of each of the modules and the various other elements of the computer. Each connector block may have sixty or even more terminals connected to various components of the modules mounted therein. When wiring the computer, electrical leads from other connector blocks or other elements of the computer must be soldered or, more preferably, wire-wrapped to the terminals of the block. While this can be done by hand, it is then quite time-consuming. Therefore, it is desirable that the wire wrapping operation be done automatically.

The difficulty with this, however, is that the connector blocks must be positioned extremely accurately to enable the wire-wrap machine to station itself properly above each terminal of each block. Also, usually the blocks are arranged in long rows. Consequently, the wire-wrap machine must be able to advance in uniform increments from one terminal to the next along the entire row of blocks. Obviously, this demands very precise positioning of the blocks relative to one another.

In prior assemblies, the connector blocks are usually screwed or bolted to a frame within the computer. The screw holes in the blocks and frame determine the vertical and horizontal positions of the blocks. In practice it proves quite difficult to drill accurately-spaced, perfectly parallel drill holes in a perfectly straight line along a long frame member. Extreme care has to be exercised to maintain the required alignment of the holes if automatic wire-wrapping is contemplated. Moreover, when mounting the connector blocks on their supporting frames, considerable time and effort must be expended in just lining up the corresponding screw holes in the block and frame simultaneously in the vertical and horizontal directions so that the screws can be inserted.

Accordingly, this invention aims to provide a connector block assembly wherein the individual connector blocks may be positioned quickly, yet accurately enough so that electrical leads can be automatically soldered or wire-wrapped to their terminals.

It is a further object of this invention to provide a connector block and means for mounting same which greatly facilitate the accurate mounting of the block within a larger electrical system.

Another object of the invention is to provide a connector block which securely supports and interconnects a multitiude of circuit modules, yet which permits their ready removal or repair.

A still further object of this invention is to provide a connector block assembly which eliminates the need for screws and screw holes to be accurately aligned simultaneously in both the vertical and horizontal directions when mounting the block.

Other objects of the invention will in part be obvious and will in part appear hereafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

In general, the connector block of this invention is used to support a plurality of plug-in printed circuit modules and to electrically connect the modules with each other and with the remaining elements of the installation. The conector block has a multiplicity of protruding terminals which connect with the modules. It is these terminals which are wire-wrapped or soldered to leads coming from the other elements of the installation. A number of these connector blocks are adapted to be mounted side by side on a horizontal supporting bar secured within the installation.

Under the invention, the means for locating each block along the supporting bar and transversely to the bar are entirely distinct and independent. Each connector block has a transverse channel in one face thereof which is adapted to receive the positioning bar. The correct location of the blocks along the bar is controlled by a row of precisely placed positioning pins which extend out from the bar. Each pin is adapted to register with a slot in the inner wall of the channel. Each such slot is elongated to an extent that it permits considerable leeway only in the transverse adjustment of the block relative to the bar so that no particular attention need be paid to that while locating the block along the bar.

Precise control over the position of each block transversely to the bar is accomplished by employing a shaving or wedging type fit between the bar and the block. Once a given block is in register with its positioning pin, it is wedged onto the bar so that the bar seats against flat accurately positioned locating surfaces on one side wall of the channel. When the bar is so seated, the block has assumed exactly the proper position relative to the bar and to the other blocks similarly situated on the bar. After a block is seated, it may be secured permanently thereto by the usual screws.

A series of such blocks thus positioned on the bar will be perfectly aligned with each other, as will be their terminals, thereby enabling a soldering or wire-wrap machine to proceed rapidly from one terminal to the next within a given connector block and also between those of adjacent connector blocks.

Figures 1, 3, 4, 5:
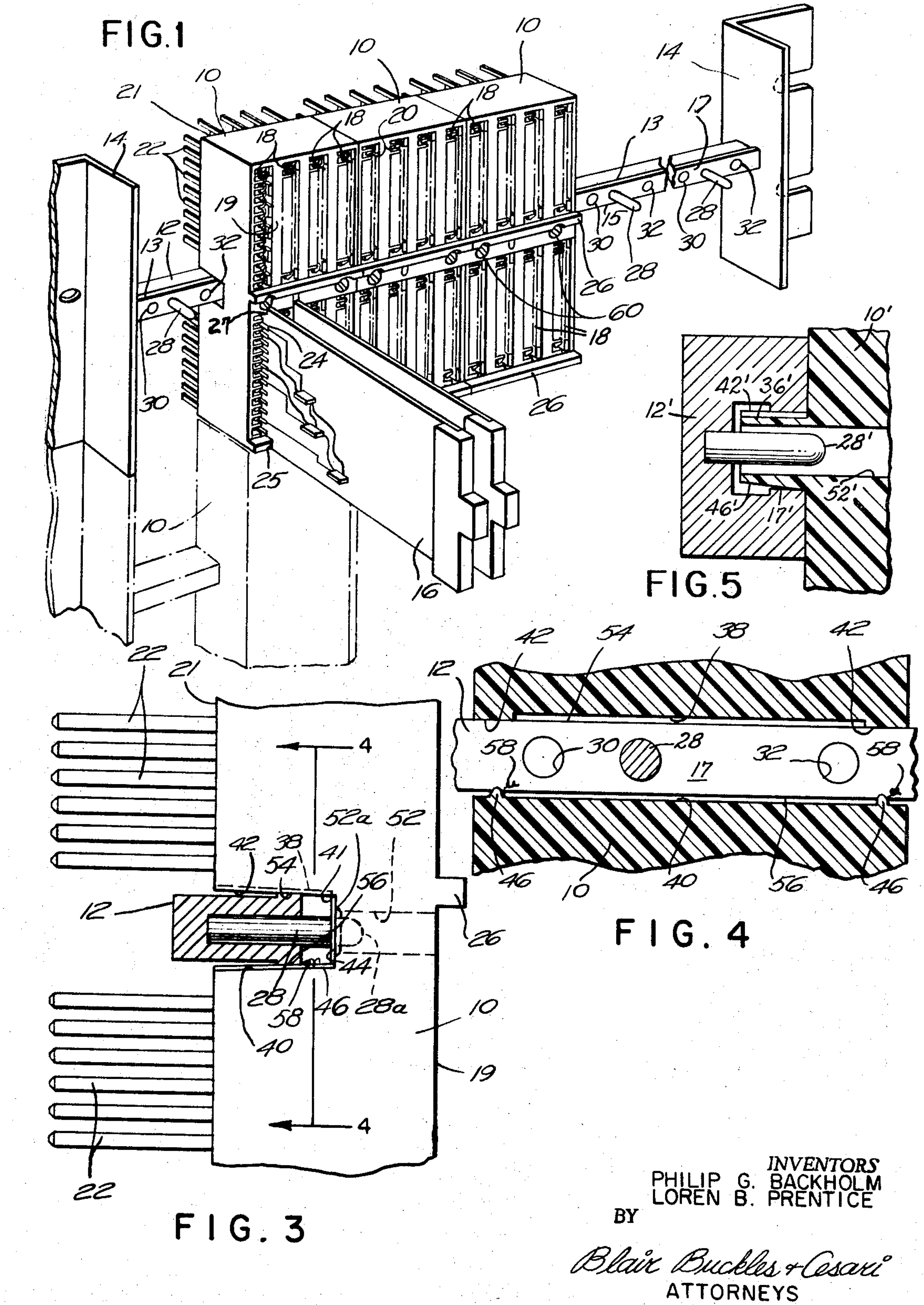
FIG. 1 is a fragmentary perspective view of a connector block assembly embodying the principles of my invention.
FIG. 3 is a fragmentary side view on a still larger scale showing the connector block as it is being seated.
FIG. 4 is a view along line 4—4 of FIG. 3.
FIG. 5 is a fragmentary sectional view showing an alternative connector block seating arrangement.

Referring now more specifically to FIG. 1 of the drawings, my connector block assembly comprises a plurality of connector blocks 10 mounted compactly side by side on a positioning bar 12. Positioning bar 12 is supported, in turn, by brackets 14 secured to each end thereof and adapted to be bolted to suitable frames (not shown) within an installation such as a computer. In practice, a typical installation may contain several such assemblies stacked as indicated by dotted lines in the drawing.

Each connector block 10 is adapted to support a number of replaceable electrical modules 16 in the form of card-like printed circuit boards. For this, each block 10 has upper and lower horizontal rows of vertical slots 18 which extend in from the back face 19 of the block. A number of resilient clip-like contacts 20 are arranged within each vertical slot 18. These contacts 20 pass through the block and extend out from the front face 21 thereof forming long terminals 22. The terminals 22 of the various blocks are adapted to be wired to each other and to the other elements of the computer., Each module 16 has a number of conductive strips 24 at one end thereof which constitute the terminals of its electrical components. This end of each module is slid into a slot 18 in the block 10 so that the strips 24 are resiliently engaged by the contacts 20. Such engagement not only establishes good electrical contact between the contacts 20 and the strips 24 but also firmly holds the module 16 within the block 10. A pair of shelves 26 extending across the block just below each row of slots 18 insure the proper insertion of the modules 16 into their respective receptacles. More particularly, each shelf 26 mates with a notch 25 in module 16 thereby positioning the module at a given height in its corresponding slot 18. Another notch 27 is provided at the top of module 16. However, notch 27 is made less deep than notch 25 so that if the module 16 is inadvertently inserted upside down into block 10, it will be displaced upwardly from the remaining modules 16 and its improper insertion made immediately apparent.

With the aforesaid arrangement, then, it will be appreciated that the modules 16 are readily accessible for repair or replacement from the rear of the system.

Still referring to FIG. 1, the positioning bar 12 is preferably a single generally rectangular casting of die cast aluminum alloy, extruded aluminum or steel. It is long enough to hold an appreciable number, say eight, blocks 10. A pair of upper and lower raised ribs 13 and 15 extend out from the bar 12 near its front face 17 all along its length. A row of precisely placed locating pins 28 are spaced along the length of bar 12. Pins 28 extend out from the front face 17 of bar 12 and terminate in rounded ends 28*a*. The spacing of these pins 28 determines the positions of the blocks 10 along the bar 12 as will be described more particularly later. Threaded screw holes 30 and 32 are formed in the bar 12 on opposite sides of each of the pins 28 to secure the blocks in place once they are properly seated on the bar. Each pin 28 is displaced toward its adjacent screw hole 30 and away from its hole 32 for reasons to be discussed later.

Figures 2, 2A:
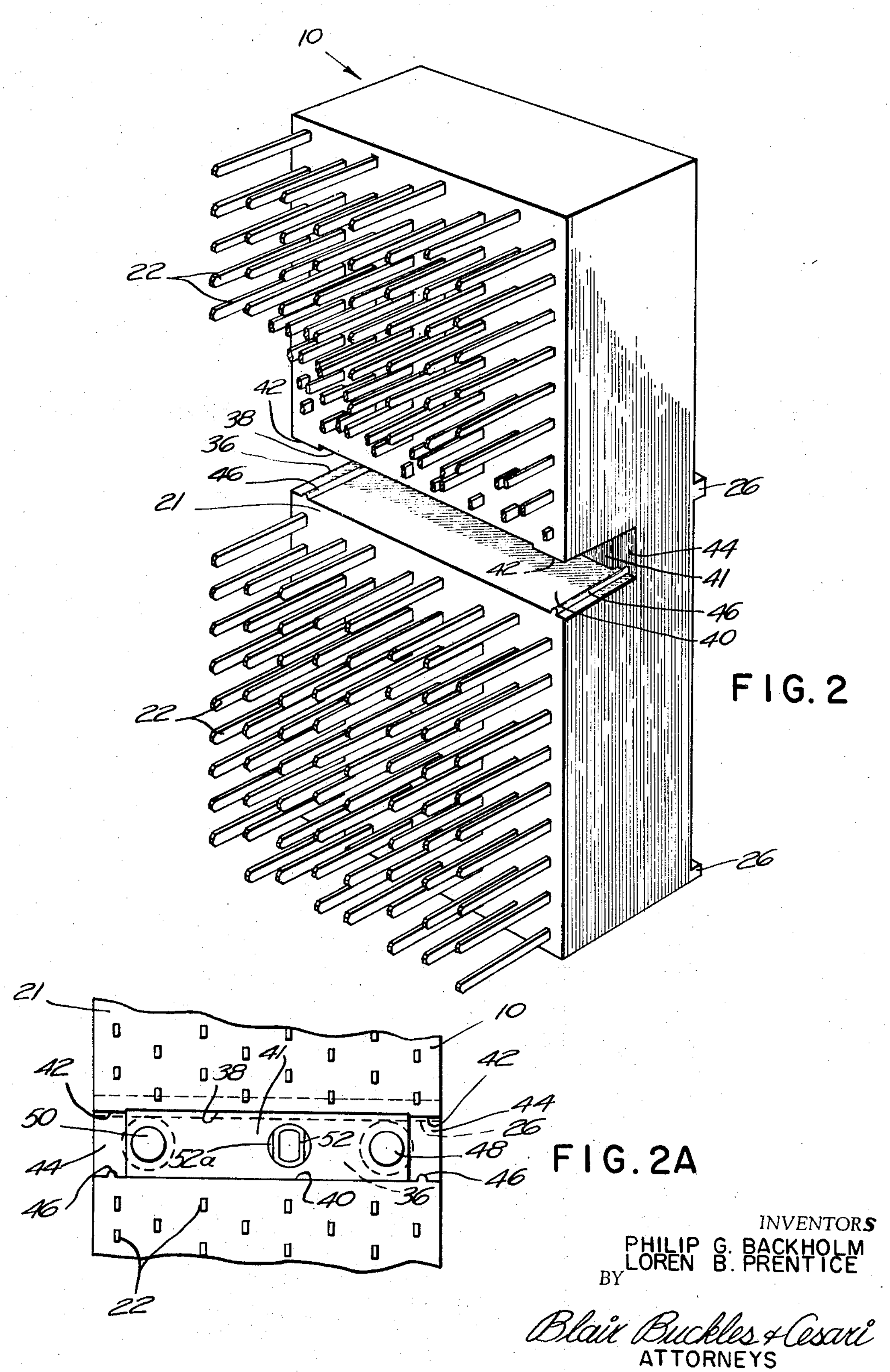
FIG. 2 is an enlarged perspective view of a connector block made in accordance with this invention.
FIG. 2A is a fragmentary front view of the connector block.

Referring now to FIGS. 2 and 2A, each connector block 10 is generally rectangular in shape and is constructed preferably of a high impact phenolic plastic having good insulating properties. When vertically oriented as shown, the block 10 has a large lateral channel 36 in its front face 21 which extends from one end of the block to the other. Channel 36 has upper and lower walls 38 and 40 respectively as well as an inner wall 41. Although channel 36 is generally rectangular in cross-section, its upper and lower walls 38 and 40 diverge slightly due to a small draft of approximately 1 degree in the lower wall 40. This divergence has been exaggerated somewhat in the drawings for the sake of clarity.

A pair of raised, flat locating surfaces 42 are formed in the top wall 38 of channel 36 at opposite ends thereof. The locating surfaces 42 are fairly wide and extend from the outer edge of channel 36 to the inner surface 41 thereof. They are substantially perpendicular to the front face 21 of block 10 for reasons that will become apparent. Portions 44 of inner wall 41 immediately adjacent to the locating surfaces 42 are recessed slightly from the main surface of the inner wall for reasons that will also become apparent. A pair of long, rather narrow ribs 46 are formed in the lower wall 40 of channel 36 directly opposite the locating surfaces 42. Ribs 46 also extend from the outer edge of channel 36 to the inner wall 41. Because of the divergence of walls 38 and 40, the corresponding locating surfaces 42 and ribs 46 also diverge slightly.

Referring now to FIGS. 2A and 3, a pair of counterbored screw holes 48 and 50 extend in from the rear face 19 of block 10 at each side thereof. The screw holes 48 and 50 pass out through the channel inner wall 41 just inboard of the recessed portions 44. A vertically elongated slot 52 extends in from the rear face 19 and through the channel inner wall 41 between holes 48 and 50. The slot 52 is displaced toward hole 48. The spacing therefrom is the same as that between pin 28 and hole 30 of bar 12. The width of slot 52 is slightly longer than the diameter of pin 28 and its mouth 52*a* is flared to facilitate installation of the block as will be described later.

Referring now to FIGS. 1 and 3, when mounting the block 10, the block is first juxtaposed with the bar 12 so that a pin 28 extends into channel 36. The block is slid along the bar until a pin registers with the slot 52. The pins 28 are made long enough so that when the block is loosely engaged on the bar, a pin 28 will extend somewhat into a slot 52. The rounded pin end 28*a* and the flared mouth 52*a* of slot 52 combine to guide the pin into the slot. The width of slot 52 is only slightly greater than the diameter of pin 28. Therefore, the lateral location of the block, i.e. along the bar 12, is determined by the position of the pin 28. The distance between adjacent pins 28 is, of course, just large enough to enable the blocks 10 to be compactly mounted side by side along bar 12 as seen in FIG. 1.

In practice, it is fairly easy to very accurately space all the pins along the bar 12 using a single reference or index, say, the left hand pin 28 (FIG. 1). It is much more difficult to also arrange them so that they also lie in a perfectly straight line along the bar and are perfectly positioned between the upper and lower surfaces thereof. Under this invention, however, the latter requirement does not have to be met since the pins 28 are not used to locate the blocks transversely to the bar. As mentioned previously, the slot 52 in each block 10 is elongated vertically, that is, transversely to the bar, when the block is mounted on the bar. The slot is long enough so that as long as the block is slid along the bar with the pin 28 lying within channel 36, a pin 28 will mate with a slot 52 without any particular attention being paid to vertically aligning the block. It will be apparent, then, that the slots 52 will also accommodate variations in the vertical alignment of the pins 28.

Referring to FIGS. 3 and 4, once a block 10 has been located lengthwise along bar 12 by the mating of a pin 28 and a slot 52 as aforesaid, the block is pushed more firmly onto the bar. With this, the flat surface 54 of rib 13 forms a pad which is pressed against the flat locating surfaces 42 in the block channel 36. This is due to the wedging of the oppositely disposed ribs 46 against surface 56 of the rib 15 on bar 12. For most of the way along their length, the distance between surfaces 42 and their opposing ribs 46 is slightly less than the height of bar 12. However, the bar 12 is rectangular in shape while the locating surfaces 42 and opposing ribs 46 diverge slightly. Thus, while there is sufficient clearance to permit the block to be loosely engaged over the bar initially, as soon as it is pushed any appreciable distance onto the bar, the wedging action begins. Accordingly, the fit between the bar and block becomes so tight that the tops of the ribs 46 are shaved off by rib 15 (FIG. 3) as the bar proceeds into the channel 36 producing loose shavings indicated at 58. The shavings 58 are able to escape out the ends of channel 36 or collect in the recessed portions 44 provided in the inner channel wall 41 adjacent to the ribs 42. Consequently, these shavings 58 do not interfere with the proper seating of the block 10 on the bar 12.

By the time the block 10 is pushed all the way onto the bar 12, the flat pad 54 of the bar is pressed very flat and firmly against the locating surfaces 42, thereby properly positioning the block transversely to the bar and since the surfaces 42 are perpendicular to the block face 21, simultaneously orienting the block in the vertical direction. After the block is thus seated, then screws 60 (FIG. 1) may be screwed through holes 48 and 50 in block 10 and into the threaded screw holes 30 and 32 in bar 12 to permanently secure the block in place. The pin 28 is displaced toward hole 30 and the slot 52 is displaced toward hole 48 to insure that the block is right side up before it can be installed. It should be emphasized here, however, that the securing screws 60 do not perform any block locating function. They merely hold the block in place on the bar once it is already seated. In fact, the holes 48 and 50 in the block may be oversized and preclude the tightening of the screws 60 from causing any relative movement between the bar and block.

Using this procedure, an entire row of perfectly aligned connector blocks 10 can be mounted on bar 12 as in FIG. 1. The corresponding rows of terminals 22 of all the blocks are therefore also aligned. Further, the individual terminals 22 are parallel. An automatic wire-wrapping machine can index easily in uniform increments from one terminal 22 to the next along an entire row of blocks 10. There need be no fear of a faulty connection due to a terminal 22 not being in the proper position to receive the machine.

Referring to FIG. 5, it is contemplated within the scope of this invention that the roles of bar 12 and channel 36 can be reversed. That is, the block 10′ could just as well have a protruding rib 36′ instead of the channel 36. In this event, the locating surfaces 42′ and their opposing ribs 46′ on the block are formed on opposite faces of the rib 36′. The slot 52′ and screw holes (not shown) are included as described above. The positioning bar 12′ is shaped to receive the rib. It has a longitudinal channel 17′ much like channel 36. The pins 28′ extend out from the bottom wall of the channel and are adapted to be received into the slots 52′ when the block 10′ is engaged in the bar 12′. The block seats exactly as described above.

It will be clear from the foregoing also that my mode of mounting connector blocks greatly speeds up the process of putting together a large installation involving a great number of stacks of such blocks. It completely does away with the requirement of careful sight alignment of screw holes. Rather, the blocks are positioned in one direction at a time relative to the bar by independent means which do not require any visual observation at all.

It will thus be seen that the objects set forth above among those made apparent from the preceding description are efficiently attained, and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover the generic and specific features of the invention herein described, and all statements of the scope of the invention, which, as a matter of language, might be said to fall therebetween.

Having described my invention, what I claim as new and desire to secure by Letters Patent is:

1. A connector block assembly comprising
(A) a longitudinal bar,
(B) a body of insulating material, (C) a set of electrical contacts on said body for connecting with electrical components,
(D) interfitting portions on said bar and said body which are adapted to mate with one another so as to position said body transversely to said bar while permitting movement of said body longitudinally along said bar,
(E) one or more locating pins protruding from one of said bar and said body,
(F) means defining a slot in the other of said bar and said body, said slot being arranged to receive said pin so as to position said body lengthwise on said bar while allowing movement of said body transversely to said bar.

2. A connector block assembly as defined in claim 1 wherein said body includes means for supporting said electrical components.

3. A connector block assembly as defined in claim 1 wherein said assembly comprises a plurality of said bodies seated close together side by side on said bar, each of said bodies engaging over one of said pins.

4. A connector block for assembling on a positioning bar having a series of spaced apart pins extending out from one face thereof comprising
(A) an ansulating body,
(B) a set of electrical contacts on said body for connecting with electrical modules,
(C) means defining a channel extending across one face of said body, said channel
  (1) having opposite side walls,
  (2) having a bottom wall,
  (3) being adapted to receive said bar so as to position said block transversely to said bar,
(D) means defining a slot extending through said channel bottom wall, said slot
  (1) being adapted to receive one of said pins when said block is seated on said bar so as to position said block longitudinally along said bar,
  (2) being elongated in a direction generally perpendicular to the path of said channel across said body so as to permit movement of said block transversely to said bar when said block is seated on said bar.

5. A connector block as defined in claim 4 wherein one of said channel side walls is shaped to wedge against said bar when said block is seated on said bar so as to push the bar tightly against the other of said channel side walls and thereby accurately position said block transversely with respect to said bar.

6. A conector block as defined in claim 5 wherein said one channel side wall is shaped with one or more narrow ribs extending from the top of said channel to said channel bottom wall.

7. A connector block as defined in claim 6 wherein said other channel side wall has a raised flat surface directly opposite each of said ribs against which said bar is pressed when said block is seated on said bar.

8. A connector block as defined in claim 7, wherein portions of said channel bottom wall adjacent said ribs are recessed to accommodate material stripped from said ribs when said block is seated on said bar.

9. A connector block as defined in claim 4, wherein the mouth of said slot within said channel is flared and one or more screw holes extend through said body parallel to said slot.

10. A connector block assembly comprising
(A) a longitudinal bar having opposite flat sides and a front,
(B) a series of spaced apart pins extending out from said front of said bar,
(C) means for supporting each end of said bar,
(D) a block, said block
  (1) being constructed of an insulating material,
  (2) having receptacles therein for removably receiving electrical modules, (E) means for making electrical connections with said modules, said means having terminals extending out of said block.

(F) means defining a channel across said body, said channel (1) having opposite side walls and a bottom wall, (2) being arranged and adapted to receive said bar, (3) having raised ribs extending down one side wall thereof, (4) having raised flat locating surfaces extending down the other side wall thereof opposite said ribs so that when said block is seated on said bar, said ribs wedge against one side of said bar so as to press the other side of said bar against said locating surfaces thereby to accurately position said block transversely to said bar, (G) means defining a slot in said block, said slot (1) extending through said channel bottom wall, (2) being elongated in a direction perpendicular to said channel, (3) being arranged to receive one of said pins when said block is seated on said bar so as to position said block longitudinally along said bar while permitting transverse movement of said block relative to said bar.

References Cited

UNITED STATES PATENTS

| | | | |
|---|---|---|---|
| 3,129,991 | 4/1964 | Schmitz | 339—17 |
| 3,164,750 | 1/1965 | Miller | 317—101 |
| 3,300,686 | 1/1967 | Johnson et al. | 339—17 XR |

FOREIGN PATENTS

| | | |
|---|---|---|
| 1,134,126 | 8/1962 | Germany. |
| 897,631 | 5/1962 | Great Britain. |

MARVIN A. CHAMPION, *Primary Examiner.*

PATRICK CLIFFORD, *Examiner.*